No. 851,619. PATENTED APR. 23, 1907.
G. A. H. DRESLER.
CHAIN LINK SHACKLE.
APPLICATION FILED MAR. 14, 1904.

Section A-B.

Section C-D.

WITNESSES:
W. M. Avery
A. H. Davis

INVENTOR
Gustav Adolf Heinrich Dresler
BY
ATTORNEYS.

UNITED STATES PATENT OFFICE.

GUSTAV ADOLF HEINRICH DRESLER, OF KIEL, GERMANY.

CHAIN-LINK SHACKLE.

No. 851,619.  Specification of Letters Patent.  Patented April 23, 1907.

Application filed March 14, 1904. Serial No. 198,127.

*To all whom it may concern:*

Be it known that I, GUSTAV ADOLF HEINRICH DRESLER, a subject of the Emperor of Germany, residing at 25 Karlstrasse, Kiel, in the Empire of Germany, engineer, have invented new and useful Improvements in Chain-Link Shackles, of which the following is a specification.

This invention relates to a connecting shackle for chain links of that class in which the ends of the open link are connected by means of a closing member, and the object of the invention is to so construct the parts of the connecting shackle that the means for fastening the closing part to the link will be subjected to but little strain, speedy release and opening is possible, and shocks exerted upon the closing member from outside are kept from the stud ends of the link.

The invention comprises certain novel features of construction and arrangement of parts as will be hereinafter fully described and pointed out in the claims.

Figure 1:
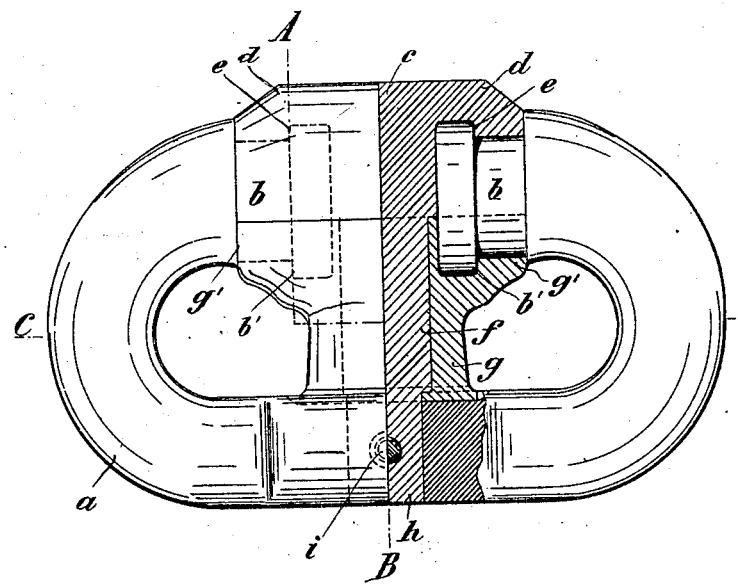
Figure 2:
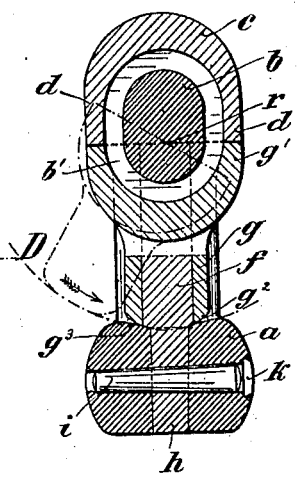
Figure 3:
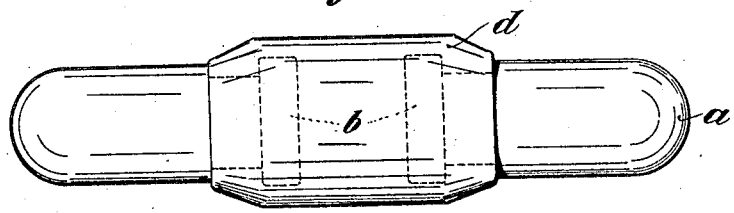
Figure 4:
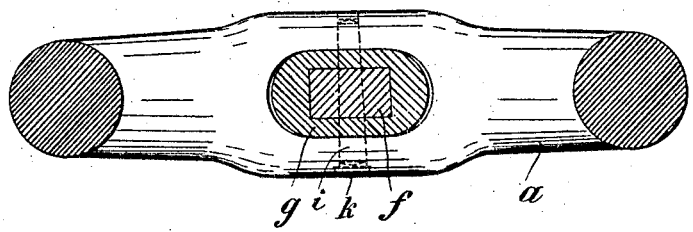

In the accompanying drawings: Figure 1 is partly a view, partly a section of a connecting shackle for chain links according to my invention. Fig. 2 is a cross section on line A—B of Fig. 1. Fig. 3 is a top view of my connecting shackle, and Fig. 4 is a horizontal section on line C—D of Fig. 1.

In my present constructional form of connecting shackle the ends of the open link are provided with studs and the closing member is provided with recesses which are directed toward the interior of the chain link and cover the connecting studs of the link in the manner of a cap. The web or shank portion of the closing member is surrounded by a box or sleeve which serves to reinforce the pin of the link by taking the strain. The connecting studs on the open link ends are provided with a flange extending all around the connecting studs. In order to be able to fully reinforce the link and to support the cap like portion of the connecting member the upper part of the reinforcing sleeve is provided, in its end part, with half cylindrical recesses corresponding with those of the cap of the connecting member. If both the reinforcing sleeve and the closing member are in their proper position they fully surround and touch the connecting studs of the link, reinforce the pin of the link by taking the strain, and keep all shocks from the stud ends.

I do not confine myself to any particular form of the different parts of my present connecting shackle, so for instance the reinforcing sleeve may be of elliptical, round, square, or any other section. But in the following specification I describe a connecting shackle in form and arrangement such as I consider convenient and well adapted to the purpose.

That others may fully understand my invention, I will particularly describe that form of it, which is shown in the drawing.

$a$ is the chain link, provided on its open ends with connecting studs $b, b$. Over these studs $b, b$ engages the closing member $c$ $e$, $e$ are recesses in the latter, so that cap like portions are formed.

$f$ is the web or shank portion of the closing member $c$.

$g$ is a reinforcing sleeve. $g'$ $g'$ is the upper part of this sleeve provided with half cylindrical recesses surrounding the lower portion of connecting studs $v$, $v$ provided with a flange like counter or bearing $v'$ $v'$ extending around the stud ends. Both the cap of the connecting member and the upper part $g'$ $g'$ of the sleeve $g$ wholly surround the end part of the connecting studs $v$, $v$. The lower end surface of the reinforcing sleeve $g$ is cylindrically formed, the middle axis of the cylindrical base $g^2$ being the same with the cylindrical recesses of the upper half-cylindrical part $g'$ of the connecting sleeve. The part $g^3$ of the link upon which the sleeve $g$ will rest, if brought into position, is curved in the same manner as the resting surface $g^2$, of the sleeve, so that the whole sleeve can easily be turned into its working position to be seen from Fig. 2. The position of the sleeve, when the same enters between the connecting studs $v$, $v$ and the resting part $g^3$ of the link is shown in Fig. 2 in dotted lines.

The closing member $d$ is provided on its web portion with a conical pin $h$ which engages in an opening in the chain link. This conical pin is secured in the link by means of a pin $i$, which latter may advantageously be secured from falling out by means of a lead-filling in a recess, by a plug $k$ or the like.

Having thus described my invention, I claim as new and desire to secure by Letters Patent:

1. In a connecting shackle for chain links, the combination with the link having stud ends provided with flange-like counter bearings ($b'$ $b'$) extending around the stud ends, of a closing member ($c$) for holding the stud ends together, the closing member being provided with a shank portion and having cap-like extensions (d d), and a sleeve (g) for supporting the stud ends, the said sleeve surrounding the shank portion of the closing member and having half cylindrical extensions (g' g') adapted to bear against the cap-like extensions of the closing member and form sleeves with the latter, the said sleeves wholly surrounding the flange-like counter bearings extending around the stud ends.

2. In a connecting shackle for chain links, the combination with the link a having stud ends provided with flange-like counter bearings (b' b') extending around the stud ends, of a closing member (c) provided with a shank portion and having cap-like extensions (d d) for engaging the stud ends, and a sleeve (g) for supporting the stud ends, the said sleeve surrounding the shank portion of the closing member and provided with half-cylindrical extensions (g' g') forming, with the cap-like extensions of the closing member, a sleeve which wholly surrounds the flange-like counter bearings at the stud ends, the end parts ($g^2$) of the sleeve (g) opposite to the extensions (g' g') being cylindrically rounded, the chain link having a correspondingly formed cylindrical recess ($g^3$) into which the said end of the sleeve fits, the said cylindrical supporting surfaces having the same axis (r) as the rounded recesses in the parts (g' g') supporting the studs.

3. In a connecting shackle for chain links, the combination with the link open at one side, and having studs on its ends at opposite sides of the opening, the said studs being provided with flanges extending around the stud ends, of a closing member having a recessed portion for connecting the stud ends, the said closing member being provided with a shank portion terminating in a pin for engaging an opening in the opposite side of the link, and a sleeve surrounding the shank portion of the closing member and having one of its end portions recessed to receive and support the studs, the said recessed portion of the closing member wholly surrounding the end part of the said studs, the other end portion of the sleeve engaging the opposite side of the link.

4. In a connecting shackle for chain links, the combination with the link open at one side and having studs on its ends at opposite sides of the opening, the said studs being provided with flanges extending around the stud ends, of a closing member for engaging the stud ends, the said closing member having a shank portion terminating in a pin adapted to be secured in an opening in the opposite side of the link, the said side of the link being formed with a rounded recess, and a sleeve surrounding the shank portion of the closing member and having one of its end portions provided with recesses corresponding with those of the closing member, the closing member and sleeve when in position entirely surrounding and bearing against the studs of the link, the other end portion of said sleeve being rounded and fitted in the correspondingly formed recess in the link.

In testimony whereof I have signed my name to this specification in the presence of two subscribing witnesses.

GUSTAV ADOLF HEINRICH DRESLER.

Witnesses:
JULIUS ROJSKE,
OTTO LAU.